(12) United States Patent
Widlroither

(10) Patent No.: US 11,466,411 B2
(45) Date of Patent: Oct. 11, 2022

(54) MACHINE FOR TRACK MAINTENANCE, MANUALLY DISPLACEABLE ON A TRACK

(71) Applicant: ROBEL BAHNBAUMASCHINEN GMBH, Freilassing (DE)

(72) Inventor: Otto Widlroither, Freilassing (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 873 days.

(21) Appl. No.: 16/335,809

(22) PCT Filed: Aug. 21, 2017

(86) PCT No.: PCT/EP2017/001001
§ 371 (c)(1),
(2) Date: Mar. 22, 2019

(87) PCT Pub. No.: WO2018/054519
PCT Pub. Date: Mar. 29, 2018

(65) Prior Publication Data
US 2020/0024809 A1 Jan. 23, 2020

(30) Foreign Application Priority Data
Sep. 22, 2016 (DE) .......................... 202016005841.0

(51) Int. Cl.
*E01B 31/17* (2006.01)
*B23P 19/06* (2006.01)
(Continued)

(52) U.S. Cl.
CPC .............. *E01B 31/17* (2013.01); *B23P 19/06* (2013.01); *E01B 29/24* (2013.01); *E01B 29/32* (2013.01); *E01B 2203/141* (2013.01)

(58) Field of Classification Search
CPC .......... E01B 29/24; E01B 29/32; E01B 31/02; E01B 31/17; E01B 2203/141
(Continued)

(56) References Cited

U.S. PATENT DOCUMENTS

| 2,989,927 A * | 6/1961 | Keller ..................... E01B 29/26 104/17.1 |
| 9,528,224 B2 | 12/2016 | Widlroither |
| 2004/0011242 A1* | 1/2004 | Roane ..................... E01B 25/28 105/72.2 |

FOREIGN PATENT DOCUMENTS

| CN | 203420190 U | 2/2014 |
| CN | 104631235 A * | 5/2015 |

(Continued)

*Primary Examiner* — Zachary L Kuhfuss
(74) *Attorney, Agent, or Firm* — Laurence A. Greenberg; Werner H. Stemer; Ralph E. Locher

(57) ABSTRACT

A machine for track maintenance is manually displaceable on a track. The machine has a work module with a handle, a working tool powered by a drive and a machine frame configured to be guided on a rail of the track. The work module is detachably connected to an energy module and the energy module has an electrical energy store and output contacts. The output contacts are detachably connected to input contacts of the work module. The work module has as the drive an electric motor supplied with electrical energy from the energy store. This solution results in a high degree of overall efficiency because the energy available in the energy store serves for the largest part for covering performance peaks.

11 Claims, 2 Drawing Sheets

(51) Int. Cl.
 *E01B 29/24* (2006.01)
 *E01B 29/32* (2006.01)
(58) Field of Classification Search
 USPC .............................................. 104/17.1, 17.2
 See application file for complete search history.

(56) References Cited

FOREIGN PATENT DOCUMENTS

| | | | |
|---|---|---|---|
| DE | 202010007264 U1 | 8/2010 | |
| DE | 202012007818 U1 | 9/2012 | |
| EP | 0576891 A1 | 1/1994 | |
| FR | 2741091 A1 * | 5/1997 | ............. B61D 15/00 |
| WO | 2006058552 A1 | 6/2006 | |
| WO | 2017017432 A1 | 2/2017 | |

\* cited by examiner

MACHINE FOR TRACK MAINTENANCE, MANUALLY DISPLACEABLE ON A TRACK

FIELD OF TECHNOLOGY

The invention relates to a machine for track maintenance, manually displaceable on a track, which has a work module comprising a handle, a working tool powered by a drive and a machine frame designed to be guided on a rail of the track, wherein the work module is detachably connected to an energy module.

PRIOR ART

A small machine of this type, designed to be guided on the track by hand, is flexible and quickly deployable. Its weight is limited in order to ensure a simple transport between individual track construction sites. Lifting onto a track or off track normally takes place by two persons by means of ergonomically arranged handles.

For example, a grinding machine for grinding rail heads is known from DE 20 2010 007 264 U1. Here, a combustion engine fastened in a machine frame is employed as a drive. A work module is arranged for pivoting relative to the machine frame, wherein a grinding unit is connected to the combustion engine via a flexible drive shaft.

A small machine of modular design is known from DE 20 1012 007 818 U1. This machine, manually displaceable on the track, comprises a work module with a hydraulic drive for powering a working tool. Detachably coupled thereto is an energy module which comprises a combustion engine and a hydraulic pump. In this, the combustion engine must be configured such that it delivers the maximum performance required for operating the working tool. This, however, is normally required only briefly during a work cycle, for example when clamping a clip connection or during tightening of a fastening screw.

SUMMARY OF THE INVENTION

It is the object of the invention to provide an improvement over the prior art for a machine of the type mentioned at the beginning.

According to the invention, this object is achieved by way of a machine having the features of the independent claim. Dependent claims indicate advantageous embodiments of the invention.

In this, the energy module comprises an electrical energy store and output contacts, wherein the output contacts are detachably connected to input contacts of the work module, and wherein the work module comprises as a drive an electric motor supplied with electrical energy from the energy store. On the one hand, this kind of solution is ergonomic on the basis of the possibility of separate transport of work module and energy module. On the other hand, there is a high overall efficiency factor because the energy available in the energy store serves for the most part to cover performance peaks. There are no idle times of the drive, such as is the case with known machines having a mechanically or hydraulically powered working tool.

An advantageous embodiment of the invention provides that the energy module comprises a combustion engine coupled to a generator, and that the generator is connected to a charging device for charging the electrical energy store. With this, the dimensioning of the energy store and of the combustion engine is matched to the electric energy required during a work cycle. In particular, the combustion engine delivers an average performance, wherein energy is intermediately stored in the energy store and is available for covering performance peaks.

For efficient handling of the machine, it is advantageous if the input contacts are integrated in a mechanical receiving device of the work module, and if the output contacts are integrated in a mechanical connecting device of the energy module. In this manner, an electrical contacting takes place simultaneously with a mechanical coupling of work- and energy module.

In an advantageous further embodiment of the energy module, the electrical energy store comprises a super capacitor. With this, a high output density can be achieved in a small space and with small weight. In addition, a super capacitor allows quick unloading and a sufficient number of loading- and unloading cycles, whereby a machine operation with recurring performance peaks which increase by leaps is optimally supported.

It is further useful if the electrical energy store comprises an accumulator. In this way, electrical energy is intermediately stored for a longer duration of machine operation. If the accumulator is dimensioned appropriately, a supplying combustion engine-generator-unit can be temporarily switched off (for example in a tunnel) or be omitted totally, if the accumulator is charged by means of an external source or exchanged during work breaks.

In a further development of the inventive subject, the input contacts are connected to a distributing device, to the output of which the electric motor is connected. Thus, the control of the electric motor is integrated in the work module. Via the input contacts, direct current is supplied from the electrical energy store.

In this, it is favourable if the drive is designed as a brushless electric motor. An electric motor of this type is, on the one hand, low-maintenance and, on the other hand, can be controlled in a simple manner by means of a frequency converter.

A further improvement provides that the work module is connected to the energy module via a detachable data cable. With this, condition data of the energy module can be transmitted to a display device of the work module. Also possible with this is the transmitting of control data.

For a particularly efficient machine, it is advantageous if the energy store has a capacity with which the energy required for a work cycle of the machine is covered with an approximately constant performance of the combustion engine. Thus, the combustion engine always works in an optimal range with the least noise emission and lowest fuel consumption.

In addition, it is favourable if the machine includes a machine control designed as a memory-programmable control. With this, besides an adaptable motor control, additional functions can also be implemented.

In an advantageous embodiment of the machine as a grinding machine, the work module encompasses a grinding device for grinding the rail. This embodiment is useful particularly in the case of grinding devices which are pivotable relative to the machine frame, because the drive can then be integrated in the grinding device. The supply takes place via flexible electrical lines which allow a largely free tilting of the grinding device.

Another embodiment of the machine provides that the work module encompasses a screwing- or clipping device for detaching and affixing rail fastenings of the track. With this, particularly the cyclic work mode is supported in which only short load peaks occur repeatedly. These load peaks are covered by means of the intermediately stored energy from the electric energy store.

BRIEF DESCRIPTION OF THE DRAWINGS

The invention is described by way of example below with reference to the attached figures. There is shown in schematic representation in.

DESCRIPTION OF THE EMBODIMENTS

Figure 1:
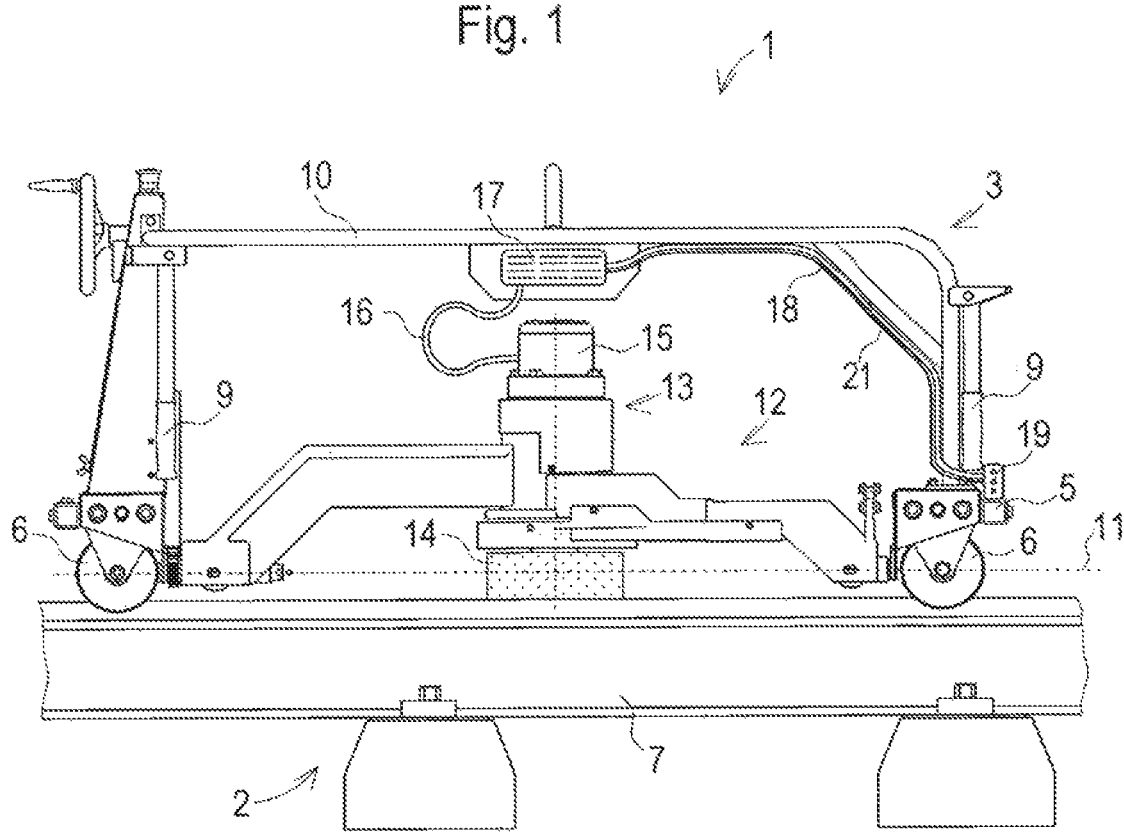
FIG. 1 a rail-guided grinding machine
Figure 2:
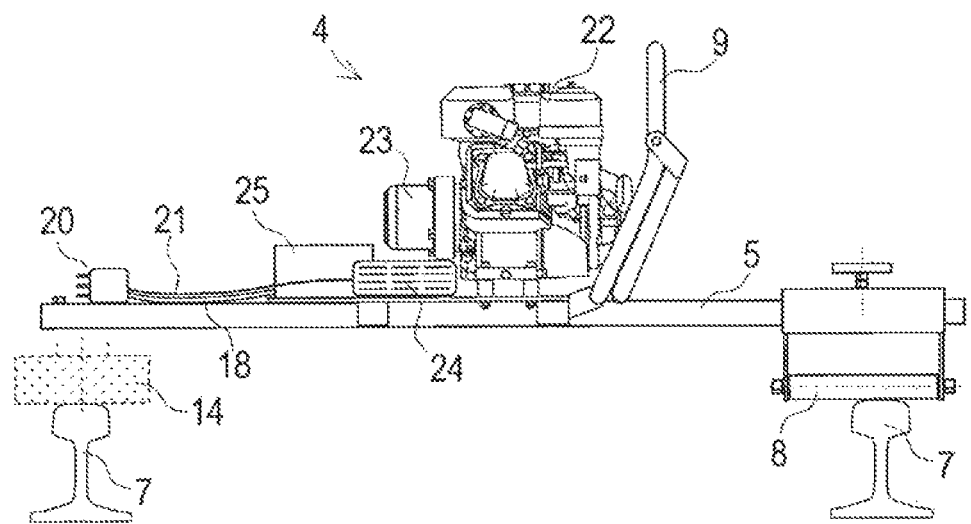
FIG. 2 transverse cantilever of the machine, an including energy module

The machine 1, shown in FIG. 1, for maintenance of a track 2 is a manually guided grinding machine. The latter encompasses a work module 3 and an energy module 4 which is visible in FIG. 2. The two modules 3, 4 are detachably connected mechanically via a transverse cantilever 5. The machine 1 is guided on a rail 7 of the track 2 by guide rollers 6 and supported with regard to the other rail 7 of the track 2 via the transverse cantilever 5 by a roller 8 fastened thereto.

The work module 3 has handles 9 which are arranged on a machine frame 10. By means of these handles 9, the machine 1 can be set on or removed from the track. A grinding device 12 is arranged in the machine frame 10 for pivoting about a pivot axis 11 extending in the longitudinal direction of the track 2. Said grinding device 12 comprises a drive 13 for powering a working tool 14 which is designed in the present example as a grinding disk. By manually displacing the machine 1 along the track 2 and tilting about the pivot axis 11, a contour of the rail head of the one rail 7 can be ground.

The drive 13 is configured as a brush-less electric motor 15. The latter is connected via a flexible motor connection line 16 to a distributing device 17. The control of the electric motor 15 is accommodated in this distributing device 17. A supply line 18 connected to input contacts 19 of the work module 3 leads to the distributing device 17.

The supply line 18 is led further to the energy module 4 via output contacts 20. Optionally, a data line 21 runs parallel to the supply line 18 in order to transmit condition data or control data between the work module 3 and energy module 4. Favourably, the input contacts 19 and output contacts 20 are designed as elements of a detachable plug connection.

The energy module 4 is fastened to the transverse cantilever 5 and comprises a combustion engine 22, a generator 23, a charging device 24 and an electrical energy store 25. Preferably, the latter is a so-called super capacitor 26. It may also be useful to arrange an accumulator 27 as an alternative or in addition thereto. Further, for lifting the energy module 4, ergonomically arranged handles 9 are provided.

In an alternative embodiment not shown, the energy module 4 can be connected to the work module 3 merely by means of sufficiently long flexible lines 18, 21. The energy module 4 is then set down next to the track during a grinding operation, for example.

Figure 3:
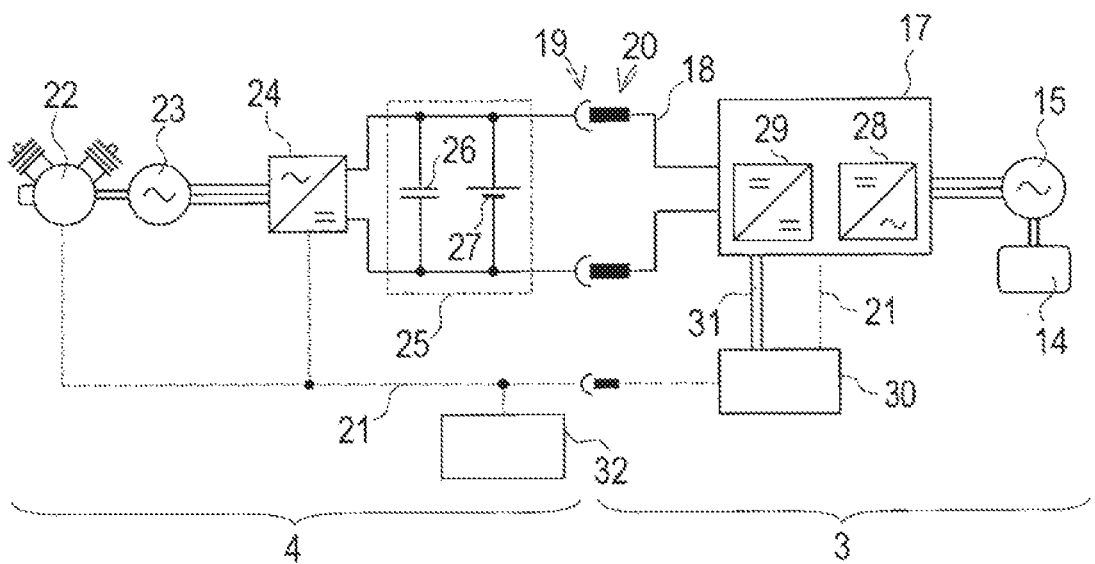
FIG. 3 circuit layout

Shown in FIG. 3 is a circuit layout. The combustion engine 22 is mechanically coupled to the generator 23. A three-phase current produced by the generator 23 is fed to the charging device 24. The latter comprises, for example, a switching converter for generating a regulated direct voltage at the output side (loading voltage).

As energy store 25, the super capacitor 26 and, if needed, the accumulator 27 are connected to the direct voltage. In the case of a parallel circuit, the super capacitor 26 serves as buffer element for covering load peaks rising in leaps, wherein a recharging takes place by means of the charging device 24. If the combustion engine 22 is shut off or missing, the energy for loading the super capacitor 26 is supplied by the accumulator 27.

Via the contacts 19, 20 of the supply line 18, the stored electrical energy is fed to the distributing device 17 of the work module 3. Here, the direct current is converted for controlling the electric motor 15. This is, for instance, a so-called brush-less direct current motor. In fact, the latter is configured like a three-phase synchronous machine with excitation by permanent magnets. A simplified frequency converter 28 with block commutation serves for converting the direct current. In the case of the grinding machine shown, it is possible to integrate the drive 13 directly into the grinding spindle.

Alternatively, a conventional direct current motor having brushes can be used, wherein a frequency converter 28 is not required. Occasionally, the use of a power transmitting element arranged between the electric motor 15 and the working tool 14 is expedient in order to match an optimal speed of rotation of the working tool 14 to a speed of rotation of the electric motor 15.

The distributing device 17 additionally comprises a DC converter 29 for converting the input-side direct current (43 volt, for example) into a supply voltage (12 volt DC, for example). Via a two-phase line 31, a machine control 30 is connected to the supply voltage. In addition, there exists a connection by means of the data line 21 in order to exchange control- and condition data between the machine control 30 and the distributing device 17. Usefully, this is a storage-programmable control (SPS) which is set up for regulating the electric motor 15 and for processing the condition data. It is also possible to implement additional functions such as an electric spindle adjustment, for example.

Via a detachable data line 21, the machine control 30 is connected to a control panel 32 of the machine 1 and optionally to the charging device 24 and the combustion engine 22. Thus, the performance of the electric motor 15 can be adjusted to the energy supplied by means of the charging device 24 during a work cycle. The control panel 32 can also be designed as an element of the work module 3 and connected directly to the machine control 30. Favourably, the control panel 32 comprises a display or light-emitting diodes for indicating the electrical energy stored in the energy store 25.

Figure 4:
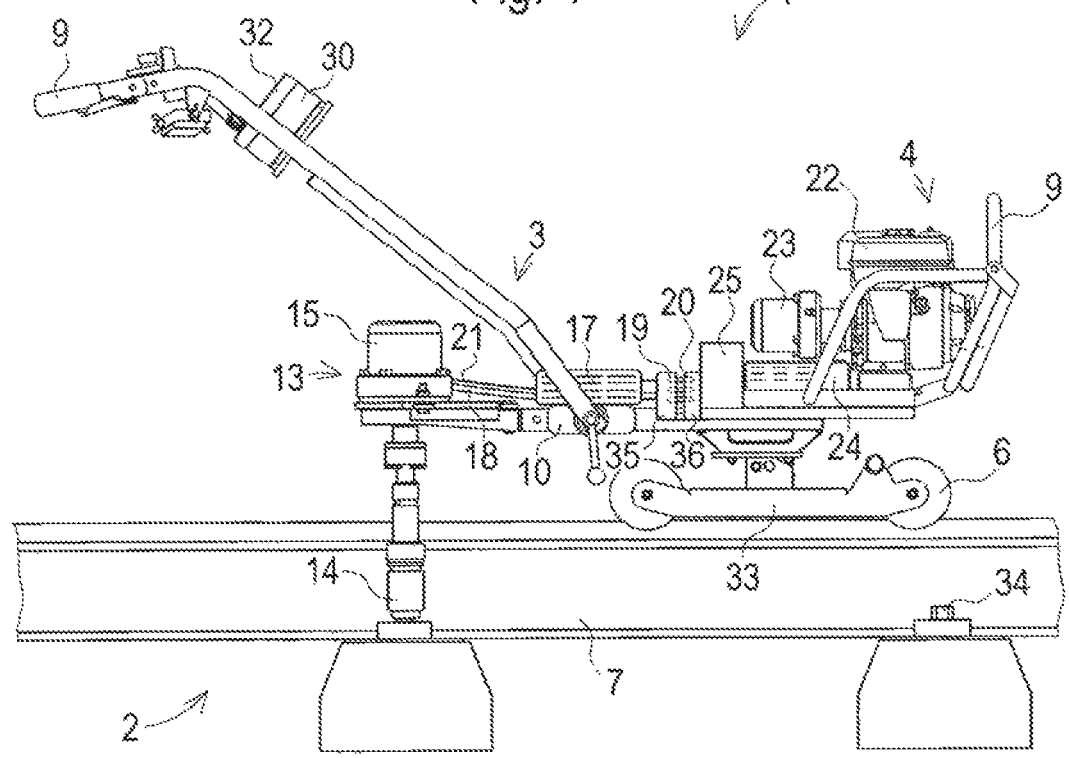
FIG. 4 rail-guided grinding machine

A further machine example is shown in FIG. 4. This is a screwing machine, the working tool 14 of which is designed as a screw spindle. The machine 1 is guided on the track 2 by means of guide rollers 6. The guide rollers 6 are elements of an undercarriage 33 which is movably connected to the machine frame 10. In this manner, the machine frame 10 is pivotable by means of handles 9 to bring the screw spindle into engagement with screws of the rail fastenings 34.

Mounted on the machine frame 10 is the work module 3 which comprises, besides the drive 13 and the working tool 14, also the control panel 32, the machine control 30 and the distributing device 17. Input contacts 19 of the work module 3 are plugged into output contacts 20 of the energy module 4.

In this, it is favourable if the energy module 4 is connected to the work module 3 by means of a mechanical coupling device, and if the input- and output contacts 19, 20 are elements of this coupling device. In this way, the electrical contacting takes place automatically upon coupling of the work- and energy module 3, 4. In particular in this, the input contacts 19 are integrated in a mechanical receiving device 35 of the work module 3, and the output contacts 20 are integrated in a mechanical connecting device 36 of the energy module 4.

The supply of the work module 3 from the energy store 25 takes place via the plugged-together supply line 18. Additionally, a detachable data line 21 is provided for transmitting control- and condition data between the control panel 32 or the machine control 30 and the energy module 4.

In addition to the described manually guided grinding machine and the manually guided screwing machines, other machines 1 are also covered by the present invention, for example a clip machine or a machine for cutting rails 7. It can be useful—particularly in the case of machines 1 with, as a rule, short working operations—to provide the energy module 4 with an energy store 25 which is charged during work pauses by means of an external energy source. Then, the combustion engine 22 and the generator 23 are omitted.

In all applications with a combustion engine 22, the generator 23 and electric motor 15 can be designed largely identical in construction. For example, both are brush-less electrical machines, wherein the generator 23 is connected to a rectifier (as part of the charging device 24) and the electric motor 15 to the frequency converter 28.

Advantageously, the capacity of the energy store 25 is configured such that the energy required for a work cycle of the machine 1 is covered with a constant output of the combustion engine 22. In this, a work cycle is composed of passive phases with the working tool 14 being out of operation and active phases with operating working tool 14. A charging of the energy store 25 takes place during a passive phase and a discharging during an active phase.

In a further development, it is useful to record during several work cycles the energy required for operating the machine 1. For example, the performance curve of the electric motor 15 is measured and stored in a memory unit of the machine control 30. Subsequently, a mean value serves as target performance for the combustion engine 22. In this manner, the combustion engine 22 is operated always in an optimal performance range even under varying work conditions. In the case of longer work cycle times, for example, the motor speed of rotation can be lowered automatically in order to reduce noise and fuel consumption.

The invention claimed is:

1. A machine for track maintenance is manually displaceable on a track, the machine comprising:

a work module having a handle, an electric motor, a working tool powered by said electric motor, input contacts and a machine frame configured for guiding on a rail of the track; and an energy module detachably connected to said work module, said energy module having an electrical energy store and output contacts, said output contacts detachably connected to said input contacts of said work module and said electric motor being supplied with electrical energy from said electrical energy store;

said energy module having a generator, a charger and a combustion engine coupled to said generator, and said generator being connected to said charger for charging said electrical energy store.

2. The machine according to claim 1, wherein:

said work module has a first mechanical receiving device and input contacts are integrated in said first mechanical receiving device; and said energy module has a second mechanical connecting device and said output contacts are integrated in said second mechanical connecting device.

3. The machine according to claim 1, wherein said electrical energy store has a super capacitor.

4. The machine according to claim 1, wherein said electrical energy store has an accumulator.

5. The machine according to claim 1, wherein said work module has a distributing device with an output, said input contacts are connected to said distributing device and to said output of said distributing device said electric motor is connected.

6. The machine according to claim 1, wherein said electric motor is a brushless electric motor.

7. The machine according to claim 1, further comprising a detachable data cable and said work module is connected to said energy module by said detachable data cable.

8. The machine according to claim 1, wherein said electrical energy store has a capacity with which the electrical energy required for a work cycle of the machine is covered with an approximately constant performance of said combustion engine.

9. The machine according to claim 1, further comprising a machine controller configured as a memory-programmable controller.

10. The machine according to claim 1, wherein said work module has a grinder for grinding the rail.

11. The machine according to claim 1, wherein said work module has a screwing-device or a clipping device for detaching and affixing rail fastenings of the track.

* * * * *